United States Patent [19]

Halliday et al.

[11] Patent Number: 4,664,818

[45] Date of Patent: May 12, 1987

[54] DRILLING MUD ADDITIVE

[75] Inventors: William S. Halliday, Coppell; Vincent M. Thielen, Hurst, both of Tex.

[73] Assignee: Newpark Drilling Fluid Inc., Houston, Tex.

[21] Appl. No.: 759,430

[22] Filed: Jul. 26, 1985

[51] Int. Cl.$^4$ .............................................. C09K 7/02
[52] U.S. Cl. .................................. 252/8.511; 252/8.51
[58] Field of Search ............... 252/8.5 A, 8.5 B, 8.5 C

[56] References Cited

U.S. PATENT DOCUMENTS

| | | | |
|---|---|---|---|
| 2,165,824 | 7/1939 | Vietti et al. | 255/1 |
| 2,718,497 | 9/1955 | Oldham | 252/8.5 |
| 2,775,557 | 12/1956 | Morgan | 252/8.5 |
| 2,868,726 | 1/1959 | Brukner et al. | 252/8.5 |
| 2,911,365 | 11/1959 | Burland et al. | 106/300 |
| 2,948,678 | 8/1960 | Turner et al. | 252/8.5 |
| 3,017,351 | 1/1962 | Scott et al. | 252/8.5 |
| 3,032,499 | 5/1962 | Brown | 252/8.55 |
| 3,039,529 | 6/1962 | McKennon | 66/275 |
| 3,040,820 | 6/1962 | Gallus | 252/8.5 |
| 3,070,543 | 12/1962 | Scott, Jr. | 252/8.5 |
| 3,070,544 | 12/1962 | Johnson et al. | 252/8.5 |
| 3,081,260 | 3/1963 | Park | 252/8.5 |
| 3,116,264 | 12/1963 | Wahl | 252/8.55 |
| 3,197,428 | 7/1965 | Siegele | 260/29.6 |
| 3,254,719 | 6/1966 | Root | 166/308 |
| 3,318,396 | 5/1967 | Tailleur | 242/8.5 |
| 3,323,603 | 6/1967 | Lummus et al. | 252/8.5 |
| 3,336,977 | 8/1967 | Amott | 166/9 |
| 3,338,320 | 8/1967 | Gilson et al. | 252/8.5 |
| 3,366,584 | 1/1968 | Zimmerman | 252/8.5 |
| 3,511,779 | 6/1970 | Browning | 252/8.5 |
| 3,558,545 | 1/1971 | Lummus | 260/29.6 |
| 3,654,164 | 4/1972 | Sperry | 252/8.5 |
| 3,738,437 | 6/1973 | Scheuerman | 252/8.5 |
| 3,743,018 | 7/1973 | Norton et al. | 252/8.5 |
| 3,948,783 | 4/1976 | Szabo et al. | 252/8.5 |
| 3,985,631 | 10/1976 | Hora et al. | 204/98 |
| 4,000,076 | 12/1976 | Bodine | 252/8.5 |
| 4,008,164 | 2/1977 | Watson et al. | 252/8.55 |
| 4,098,700 | 7/1978 | Hartfiel | 252/8.5 |
| 4,137,969 | 2/1979 | Phalangas et al. | 252/8.55 |
| 4,201,679 | 5/1980 | Barker et al. | 252/8.5 |
| 4,268,400 | 5/1981 | Lucas et al. | 252/8.5 |
| 4,340,525 | 7/1982 | Hubner et al. | 252/8.55 |
| 4,384,096 | 5/1983 | Sonnabend | 526/313 |
| 4,462,718 | 7/1984 | McLaughlin et al. | 252/8.55 |

FOREIGN PATENT DOCUMENTS 6414645 6/1965 Netherlands .

Primary Examiner—Herbert B. Guynn
Attorney, Agent, or Firm—Wilkinson, Mawhinney & Theibault

[57] ABSTRACT

An additive for drilling in water-sensitive shales comprising a partially hydrolyzed acrylamide-acrylate copolymer, potassium chloride and a polyanionic cellulose.

2 Claims, No Drawings

DRILLING MUD ADDITIVE

BACKGROUND OF THE INVENTION

The present invention is directed to an additive for drilling fluid to avoid borehole problems due to either shale instability or mechanical instability while maintaining a relatively high drilling rate.

Drilling of water-sensitive shales with conventional water-based drilling fluids has been plagued by borehole instability problems related to the swelling and sloughing of shales due to their interaction with water. Such problems include stuck drill pipe, time lost in redrilling shale that has sloughed into the borehole, difficulty in running casing, and the like. Heretofore an avoidance of such problems required the use of a dense viscous aqueous drilling fluid or oil-based drilling fluids. However, these solutions are relatively expensive because of slow drilling rates and/or high drilling mud costs.

The shale destabilizing interaction of water and water-sensitive shale involves a long known and troublesome problem. Osmosis and osmotic pressure forces tend to induce transfer of water from a water-containing drilling fluid to the layers of interstices within the shale, although osmosis is not a total explanation for the problems involved in drilling water-sensitive shale. Garrison, in U.S. Pat. No. 2,165,824, noted that such an interaction involves more than osmosis and, accordingly, a use of salts that provide a high osmotic pressure, i.e., an inhibited aqueous drilling fluid, will not prevent either the heaving or dispersing of the shale. Garrison suggests using a relatively concentrated aqueous solution of an alkali metal silicate. However, it is disadvantageously expensive to maintain an alkali metal silicate as a circulating drilling fluid.

One aspect of the interaction between water and a water-sensitive clayey or shaly earth formation causes a dispersion of colloidal sized particles of clay in a circulating aqueous drilling fluid. Such a dispersion tends to increase the viscosity and density of the drilling fluids. There is a problem of drilling fluid maintenance that may be expensive even in the drilling of clayey earth formations which are not sufficiently active to create a borehole instability problem. Many prior inventors have described combinations of carboxyl group containing polymeric materials that are designed to handle these clay dispersion problems. These solutions relate to clear or low solids drilling fluids or clay-containing drilling muds in which the types and amounts of the polymeric materials are adapted to effect a beneficiation or dispersion of the viscosity-adjusting bentonitic type clays while tending to flocculate and enhance the removal of the other clays, such as those encountered in drilling operations. As is known to those skilled in the art, such clay beneficiating and flocculating aqueous polymer systems are not suited for drilling in water sensitive shales and are generally no more effective than a simple aqueous clay mud with respect to stabilizing a borehole in a water sensitive shale. Such aqueous polymer systems are described in U.S. Pat. Nos.:

| | | | | |
|---|---|---|---|---|
| 2,775,557 | 3,070,543 | 3,081,260 | 3,323,603 | 3,558,545 |
| 3,511,779 | 4,201,679 | 3,985,631 | 3,032,499 | 3,039,529 |
| 2,948,678 | 3,116,264 | 3,197,428 | 3,336,977 | 3,366,584 |
| 3,654,164 | 3,743,018 | 3,254,719 | 4,268,400 | 4,340,525 |
| 4,384,096 | 4,137,969 | 4,472,718 | 4,008,164 | 2,911,365 |
| 3,948,783 | 3,040,820 | 2,718,497 | 3,070,544 | 3,338,320 |

Scheuerman, in U.S. Pat. No. 3,738,437, discloses a process for drilling water-sensitive shale by first circulating a clear drilling fluid, and then circulating an aqueous solution of partially hydrolyzed polyacrylamide and alkali metal halide, and avoiding borehole instability by circulating a suspension of pre-hydrated bentonite in the solution.

Sperry, in Dutch patent No. 6414645, discloses a cohered inhibited mud system for drilling water-sensitive shale wherein a carboxyl-group containing polymer and water-soluble inorganic salt are dissolved in water in a specific ratio of polymer to salt that is critical. The ratio of polymer to salt must be adapted to cause the surfaces of the clay particle to be slightly swollen, without being dispersed in the water, so that the swelling action seals the clay against further water intake or interaction.

SUMMARY OF THE INVENTION

Stabilization of water-sensitive shales requires reduction of hydration and/or dispersion at the surface of the well bore. This is accomplished by the use of encapsulating polymers and low to moderate pH.

The drilling fluid additive of the present invention includes an anionic copolymer. The long chain of negative ions attaches to the positive sites on the clay particles or to the hydrated clay surface through hydrogen bonding. Surface hydration is reduced as the polymer coats the surface of the clay. In addition, total encapsulation of the particle bonds the platelets or layers together and prevents dispersion. The protective coating also seals or restricts the surface fractures or pores, thereby reducing or preventing capillary movement of filtrate into the shale. This stabilizing process is supplemented by addition of a polyanionic cellulose, which also performs an encapsulation function.

The low pH values used in the process according to the present invention reduce hydration by minimizing the additions of sodium and hydroxyl ions in the form of caustic soda.

The potassium chloride enhances the rate of polymer adsorption on the clay.

The drilling additive of the present invention incorporates compounds that provide borehole stability, a high rate of penetration, minimum formation damage, and overall low well cost. The drilling additive of the present invention is preferably in the form of flowable particles that can be easily bagged and added to drilling fluid as needed. For ease of transport, the additive is preferably packaged in waterproof flexible bags, such as those made of polyethylene.

The drilling additive of the present invention includes the use of an adsorbtive polymer to stabilize troublesome shales and to retard drill solids dispersion, while maintaining a low colloidal solids content. Only a minimum of commercial bentonite need be added, and the pH can be maintained at a low to medium level. Chrome lignosulfonate may be replaced by a copolymer.

The primary ingredient of the drilling additive is a copolymer composition which readily adsorbs onto the well bore face and drill cuttings that retards the imbibition of water. Controlling water imbibition reduces shale swelling, which is the primary reason for the sloughing and spalling of brittle shales. The adsorbed polymer film also provides a lubricating surface layer that reduces attrition and grinding on the drill solids as well as the borehole. This action reduces solids dispersion and mud making and is also instrumental in controlling borehole enlargement. The adsorbed polymer film inhibits the adhesion of gumbo shale cuttings and thus greatly reduces bit and stabilizer balling while drilling these relatively soft, sticky shales.

The copolymer composition is a partially hydrolyzed polyacrylate-polyacrylamide copolymer which is mixed with potassium chloride. The preferred polymer for lowering the filtrate loss is a polyanionic cellulose polymer.

The partially hydrolyzed polyacrylate-polyacrylamide polymers which are useful in the present invention are formed by polymerizing acrylamide with an acrylate and subsequently hydrolyzing the acrylamide. The molecular weight of the copolymer should be at least greater than about one million and is preferably greater than about three million. The range of hydrolysis (and-/or the proportion of the amide groups of the polyacrylamide that are carboxyl groups) should be from about 20 to about 50 percent; extents of hydrolysis of from about 30 to 40 percent are particularly suitable. As known to those skilled in the art, these polymers are usually marketed in the form of their sodium salts. As used in the present invention, the amounts of the polymers refers to the amounts of the sodium salt or the equivalent amount of polymer that is needed to form the sodium salt.

Potassium chloride is the preferred salt for use in the present invention to enhance the rate of polymer adsorption on the clay.

The anionic cellulose polymer can be a carboxymethyl cellulose polymer. Carboxymethyl cellulose indicates a class of materials. Ordinarily, the sodium salt of the carboxymethyl cellulose is indicated. The term CMC will be used hereinafter for convenience to designate sodium carboxymethyl cellulose. For the purpose of the present invention, other alkali metals can be substituted for sodium, and the ammonium salt can also be used. CMC itself can vary in two ways. First, the length of the cellulose molecule may vary. Cellulose is a polymer made up of an hydroglucose units. The longer the chain of these units in a polymer, the higher is the viscosity of the resulting CMC. Thus, high viscosity CMC is made up of polymers having high molecular weights. The medium viscosity CMC, the polymers are the lower molecular weight. In low viscosity CMC, the polymer is of still lower molecular weight. The second variation in CMC is in the degree of substitution which has taken place when CMC is formed from cellulose. Carboxymethyl groups may be added to any of the three hydroxyl units on each anhydroglucose nucleus. CMC is available having an average of from 0.3 to 1.2 carboxymethyl groups per anhydroglucose unit.

DETAILED DESCRIPTION OF THE INVENTION

The drilling fluid additive of the present invention is in the form of a flowable, particular solid that can be packaged for easy addition to any desired drilling fluid. The additive includes from about 20-35% by weight of partially hydrolyzed polyacrylate-polyacrylamide copolymer, from about 60-75% by weight of an alkali metal salt, and from about 1 to about 5% by weight of a low to medium viscosity polyanionic cellulose. Preferred amounts are about 27% of the partially hydrolyzed polyacrylate-polyacrylamide copolymer, about 70% by weight of the alkali metal salt, and about 3% of the polyanionic cellulose.

TABLE I gives shale stabilization data developed by hot rolling cuttings obtained from an offshore Louisiana well in various fluids. The procedure consisted of separating the larger size cuttings in the 4 to 8 mesh range from the rest of the cuttings. Twenty gram samples of these cuttings were put into the various fluids and hot rolled at 150° F. for 18 hours. After hot rolling, the cuttings were screened through a 10, 20, 30 and 40 mesh screen and the percent cuttings retained on each screen was measured. It is obvious from the results of the test that the drilling fluid additive of the present invention produced the greatest stabilization.

The additive used included 27% by weight of partailly hydrolyzed acrylamide-acrylate copolymer, 70% by weight of potassium chloride, and 3% by weight of medium viscosity polyanionic cellulose.

TABLE I

| SCREEN SIZE | FLUID W/ADDITIVE, % RETAINED | DRISPAC FLUID, % RETAINED | GYP FLUID, % RETAINED | LIGNOSULFONATE FLUID, % RETAINED |
| --- | --- | --- | --- | --- |
| 10 | 49.1 | 8.5 | 3.8 | 0 |
| 20 | 7.8 | 16.3 | 10.0 | 0 |
| 30 | 0.5 | 2.2 | 4.5 | 0 |
| 40 | 0.5 | 1.3 | 1.8 | 0 |
| >40 | 42.2 | 71.8 | 80.0 | 100.0 |

Mechanical erosion of the well bore is a controversial subject, since evaluation of down hole parameters are difficult However, it may be agreed that shear stresses of the annular flow may result in erosion and that erosion may increase as the flow pattern converts from laminar to turbulent.

To the extent that flow pattern only is critical, flow rates and mud rheology must be coordinated. Considering mud rheology, the maintaining of low bit viscosity and optium annular viscosity necessitates the use of shear thinning materials. The effectiveness of bentonite is reduced in inhibitive mud systems. Therefore, polymeric materials are required. The fluid additive of the present invention imparts a shear thinning quality to the fluid.

TABLE II describes the viscosity differences between a typical lignosulfonate mud and a mud treated with the present invention. The two muds were prepared initially with essentially the same viscosity. The two muds were hot rolled with drilled chips in them and then screened through a 40 mesh screen; viscosities were then retaken. The lignosulfonate fluid gained over twice the viscosity due to chip erosion. This illustrated the advantage of using the additive of the present invention.

TABLE II

| PROPERTIES | #1 CLS FLUID | #2 ADDITIVE W/ BENTONITE | #3 #1 PLUS 95 g GUMBO WEDGE | #4 #2 PLUS 95 g GUMBO WEDGE |
| --- | --- | --- | --- | --- |
| Mud weight, lb/gal | 16.0 | 16.0 | 16.0 | 16.0 |
| 600 rpm Fann Reading | 56 | 50 | 179 | 68 |
| 300 rpm Fann Reading | 29 | 29 | 106 | 41 |
| Plastic Viscosity, cp | 17 | 21 | 73 | 27 |
| Yield Point, lb/100 sq ft | 12 | 8 | 33 | 14 |
| Initial Gel, lb/100 sq ft | 1 | 4 | 7 | 9 |
| 10 Min Gel, lb/100 sq ft | 5 | 16 | 49 | 35 |

The competence of the formation is an important factor which determines the effect of the annular flow. Therefore, chemical stabilization coupled with annular flow control enhances borehole stability.

The additive of the present invention serves two functions. First, it facilitates control of annular flow values. Second, by adsorption to the well bore surface, the competence of the formation is maintained and erosion is retarded. Additionally, the drag forces are reduced by the polymeric film.

The additive of the present invention is an excellent encapsulating polymer for the reduction in hydration/dispersion and prevention of adhesion between solids and drill string. The use of the additive of the present invention along with controlling annular cuttings concentrations is a valid approach to preventing balling.

Torque and drag reduction is greatly facilitated as the above objectives are achieved. Additionally, the coefficient of friction is reduced by the polymeric coating of the well bore surface.

TABLE III presents comparisons of lubricity between various fluids. The additive of the present invention is a lab prepared fluid with the additive as described in Tables I and II and Drilose replacing a portion of gel. The Flo-Ez system is also lab mud, while the Gyp system is a field mud.

TABLE III

| Fluid | Amps vs 200 lbs | Amps vs 200 lbs | Amps vs 300 lbs |
| --- | --- | --- | --- |
| Additive to 12.5 ppg mud | 15 | 18 | 22 |
| Chrome Lignosulfonate to 12.5 ppg mud | 17 | 22 | 32 |
| Water | 24 | 36 | — |
| 20# gel/bbl H$_2$O | 27 | 42 | — |
| 12.5 Gyp mud | 21 | 23 | 25 |

Control of fluid loss and filter cake quality is necessary for reduction of torque and drag, swab and surge pressure, and differential sticking. The quality of the filter cake is a function for solids type, parricle size, and solids concentration.

The additive of the present invention reduces fluid loss by encapsulation, viscosification of the filtrate, and polymer plugging of pores.

Fluid loss reduction is facilitated by the addition of regular or low viscosity polyanionic cellulose, which functions as an effective reducing agent as well as by encapsulation, viscosification, and polymer plugging.

Drilling fluids facilitate penetration rates by low bit viscosities, lowest possible density, and low coefficient of friction for effective bit weight. The additive of the present invention promotes low bit viscosities as a result of shear thinning polymers and reduced bentonite concentration. By maintaining well bore stability, mud density is restricted to containing formation pressure. In addition, the reduction of torque and drag facilitates desired rotary speeds and more effectively places weight on the bit.

The additive of the present invention can be used in conjunction with other drilling mud additives in situations where the properties of the drilling mud require additional additives. A modified low molecular weight polyacrylate may be added to modify rheological properties of the additive of the present invention at low to moderate pH ranges. Thus, the dispersive effect of high pH on drill solids is avoided, resulting in less mud making, reduced chemical treatment, and improved borehole stability.

A blend of viscosifying organic polymers, including guar gum and hydroxyethyl cellulose, can be added to assist the additive of the present invention in providing hole cleaning and suspension properties without the addition of Wyoming bentonite. In drilling areas with highly dispersive shales, the additive of the present invention requires very little aid in building viscosity. However, when only hard, brittle shales are present, some assistance is required, and the blend of viscosifying organic polymers can provide this assistance without significantly increasing the colloidal solids in order to obtain the desired suspension characteristics.

Solids control includes solids removal and dilution. The burden of control is reduced when the incorporated solids are restricted to those generated by the bit. Additionally, prevention of dispersion of produced solids enhances control. Therefore, as the additive of the present invention reduces hydration and dispersion and stabilizes the well bore, solids control is reduced as a problem.

The per barrel cost of the system is such that the dilution costs are low relative to other inhibitive systems. In addition to solids control equipment and dilution, partial displacement should also be considered to facilitate solids control economically.

The additive of the present invention is used in concentrations of 0.20 lb to 2.0 lb of additive per barrel of drilling fluid. A concentration of 1.0 lb/bbl of additive is normally recommended unless experience in the area indicates that a higher or lower concentration is required.

The additive of the present invention is a multifunction product which facilitates well bore stability, rheological control, fluid loss control, and friction reduction. The additive beneficiates mud management and operating procedures.

The coating of drill solids and the well bore surface reduces hydration and/or dispersion of water-sensitive shales. The polymeric viscosification of the drilling gluid and filtrate promotes shear thinning at the bit while maintaining desired ehrological properties in the annulus.

The additive can be used in aqueous liquid suitable for drilling in water-sensitive shales. These aqueous liquids can be water or substantially any aqueous solution that is free of interfering solutes. Examples of suitable aqueous liquid include natural waters or brines or sea waters and/or waters softened or otherwise treated by means of ion exchange resins, flocculating agents, etc., comprising aqueous solutions that are free of significant proportions or solutes that cause chemical changes in the copolymer molecules such as degradation, cross-linking, etc. Relatively soft sodium or potassium brines are particularly suitable for the process of the present invention.

The additive of the present invention has been used successfully in high angle directional wells offshore as well as in high pressure deep wells.

What is claimed is:

1. A process for drilling a borehole that encounters a water-sensitive shale, with the borehole being drilled by operating a drilling means, and circulating therein a drilling fluid, when the encountering of borehole instability due to the interaction of the water and water-sensitive shale is at least imminent, circulating as the drilling fluid an aqueous brine solution that contains from about 0.2 to about 2.0 pounds of an additive per barrel, the additive comprising:
   (a) 27% by weight of a partially hydrolyzed polyacrylate-polyacrylamide copolymer having a molecular weight of at least three million and which is from about 20 to about 50% hydrolyzed;
   (b) 70% by weight of potassium chloride;
   (c) 3% by weight of a low to medium viscosity carboxymethylcellulose; with the aqueous solution being circulated so that the shale is contacted by the solution and stabilized by the adsorption of the polymer.

2. The process of claim 1 wherein the additive is introduced into the process in a flowable particulate form.

* * * * *